United States Patent
Dierks, Jr. et al.

(10) Patent No.: US 7,512,072 B2
(45) Date of Patent: Mar. 31, 2009

(54) TCP/IP METHOD FPR DETERMINING THE EXPECTED SIZE OF CONJESTION WINDOWS

(75) Inventors: Herman Dietrich Dierks, Jr., Round Rock, TX (US); Agustin Mena, III, Austin, TX (US); Dirk Michel, Austin, TX (US); Jean-Philippe Sugarbroad, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 11/226,965

(22) Filed: Sep. 15, 2005

(65) Prior Publication Data

US 2007/0058531 A1   Mar. 15, 2007

(51) Int. Cl.
    *H04J 3/14*      (2006.01)
(52) U.S. Cl. ...................................... 370/236
(58) Field of Classification Search ............... 370/230, 370/231, 235, 236, 236.1, 236.2; 709/225, 709/228, 232, 233, 234, 235; 714/18, 748, 714/249, 749, 750, 751, 752
See application file for complete search history.

(56) References Cited

U.S. PATENT DOCUMENTS

| | | | |
|---|---|---|---|
| 6,505,253 B1 * | 1/2003 | Chiu et al. | 709/235 |
| 6,622,172 B1 * | 9/2003 | Tam | 709/232 |
| 6,754,228 B1 * | 6/2004 | Ludwig | 370/468 |
| 6,757,255 B1 * | 6/2004 | Aoki et al. | 370/252 |
| 2003/0002508 A1 | 1/2003 | Dierks, Jr. et al. | 370/395.52 |
| 2005/0036511 A1 | 2/2005 | Baratakke et al. | 370/469 |

OTHER PUBLICATIONS

Handley et al., "TCP Congestion Window Validation" RFC 2861, The Internet Society (2000), pp. 1-8.

* cited by examiner

*Primary Examiner*—Kwang B. Yao
*Assistant Examiner*—Anh Ngoc Nguyen
(74) *Attorney, Agent, or Firm*—Yee & Associates, P.C.; Matthew W. Baca

(57) ABSTRACT

A computer implemented method for receiving data from a sender across a network connection for the data transfer. An expected size for a congestion window for the sender is identified. An amount of the data received from the sender is tracked. An acknowledgment is sent in response to the amount of data received from the sender meet in the expected size of the congestion window for the sender.

1 Claim, 4 Drawing Sheets

TCP/IP METHOD FPR DETERMINING THE EXPECTED SIZE OF CONJESTION WINDOWS

BACKGROUND OF THE INVENTION

1. Field of the Invention

The present invention relates generally to an improved data processing system, and in particular, to a computer implemented method and apparatus for improving data transfer. Still more particularly, the present invention relates to a computer implemented method, apparatus, and computer usable code for improved throughput through a network connection by receiver side congestion window tracking.

2. Description of the Related Art

Many businesses conduct business and transfer data through networks. The Internet is one of the largest networks used for the transfer of information. Users often will request data from Websites. Additionally, businesses will transfer data to other businesses through Internet connections. Additionally, backup services using secure connections over the Internet are becoming more commonplace. The protocol used for many of these data transfers involve the transmission control protocol/Internet Protocol (TCP/IP).

A server application reading data from a TCP socket currently had two ways to obtain the data. One mechanism includes performing a normal receive system call in a socket. A socket is an IP address plus a port number. A port number is assigned to user sessions and server applications in these examples. The other method is to poll the socket for the amount of available data until enough data is present for processing. One example is the Advanced Interactive Executive (AIX®) network file system (NFS) implementation, which polls the socket for availability of data. This type of system delays the acknowledgement of a packet until either data is removed from receive buffer or a time out condition occurs. When a sender lacks acknowledgement packets, the sender eventually stops sending data. In some cases, this occurs before the full amount of data expected by the receiving application has been sent by the sender. This situation is an example of a congestion-avoided system.

This type of system is designed to avoid flooding an already congested network with more data, presuming that this additional data has a low likelihood of making it to the destination. As a result, a behavior occurs in which the sending host starts out sending two times the maximum segment size bytes, then waits until a delayed acknowledgement time out occurs on the remote host, resulting in an acknowledgement packet before sending further data. After a period of time, the "congestion window" grows large enough to encompass the full expected data. Then, this problem disappears.

However, a simple lost packet may result in the resetting of the congestion window (per TCP protocol guidelines). As a result, throughput drops for an extended period of time in this situation. This situation may continue over and over, in which case, the throughput on this TCP session will be very low (poor).

One solution to this problem is to simply have the receiver not delay the acknowledgements. This results in more acknowledgements sent by the receiver and more acknowledgements received by the sender. This increases the processing overhead on both the sender and the receiver (uses more CPU instructions and cycles). If the server has a lot of these TCP connections, then the overhead on the server will be increased.

SUMMARY OF THE INVENTION

The aspects of the present invention provide a computer implemented method for receiving data from a sender across a network connection for the data transfer. An expected size for a congestion window for the sender is identified. An amount of the data received from the sender is tracked. An acknowledgment is sent in response to the amount of data received from the sender meet in the expected size of the congestion window for the sender.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
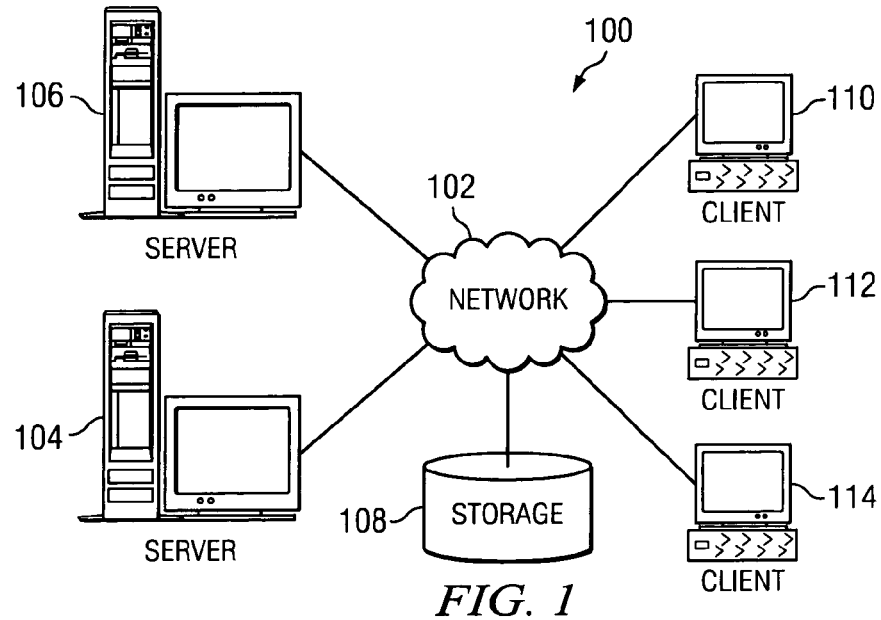
FIG. 1 is a pictorial representation of a network of data processing systems in which aspects of the present invention may be implemented.
Figure 2:
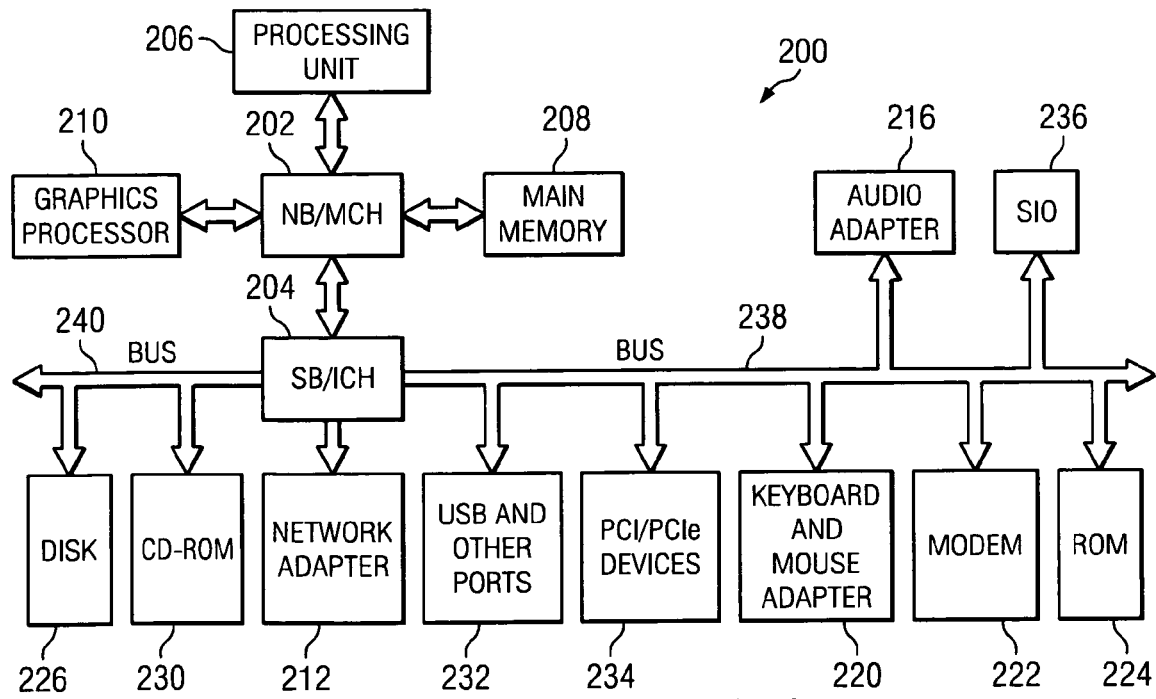
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pseries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a method, apparatus, and computer usable program code for managing the transfer of data. The different illustrative embodiments manage the throughput of data through a receiver-side congestion window tracking. In the depicted examples, this management of data is performed for connections using a transfer control protocol stack. The different aspects of the present invention add a state to the receiver side that is designed to determine at what point a sender will stop sending data. The different aspects of the present invention then send an acknowledgement (ACK) packet to prevent termination of the data transfer. The different examples track the expected size of the congestion window by the sender. Once it is determined how much data is expected for the sender's congestion window, acknowledgements are sent. In this manner, when no packet losses are present, an improved throughput is present through sending data over a network connection.

The illustrative examples add two additional fields to a socket state that is currently maintained by TCP stacks. One of the additional fields is a current expected congestion window and the other field is the amount of data received since the last time an acknowledgement packet was sent. The values of these fields are used to track the expected size of the sender's congestion window, and to send acknowledgements when the receiver receives as much data as the size of the congestion window.

Figure 3:
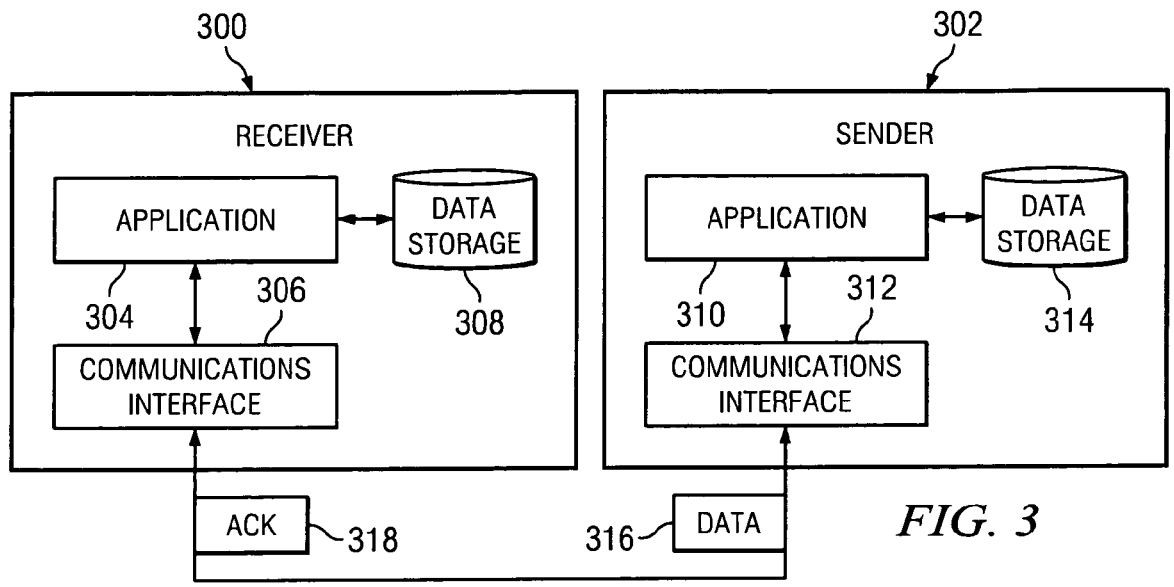
FIG. 3 is a diagram illustrating components used in transferring data in accordance with an illustrative embodiment of the present invention.

Turning now to FIG. 3, a diagram illustrating components used in transferring data is depicted in accordance with an illustrative embodiment of the present invention. In this example, receiver 300 receives data from sender 302. Receiver 300 and sender 302 are data processing systems, such as server 104 or client 114 in FIG. 1 in the illustrative examples. Depending on the particular implementation, either the server or client may be receiver or sender.

As illustrated, receiver 300 contains application 304, communications interface 306, and data storage 308. Sender 302 contains application 310, communications interface 312, and data storage 314.

In this example, application 304 receives data through communications interface 306 from application 310, which sends data to application 304 through communications interface 312. The data originates from data storage 314 and is stored in data storage 308. When application 304 begins to receive data, communications interface 306 tracks the expected size of the congestion window at sender 302 as data 316 is sent to receiver 300. An acknowledgement, such as acknowledgement 318 is sent to sender 302 when receiver 300 receives data reaching the size of the expected congestion window for sender 302.

A congestion window is a TCP state variable that limits the amount of data a TCP can send. At any given time, a TCP is unable to send data with a sequence number higher than the sum of the highest acknowledged sequence number and of the congestion window and a receiver window, which is the most recently advertised receiver window. A segment is any TCP/IP data or acknowledgement packet. A maximum segment size is the size of the largest segment that can be sent by sender.

Additionally, communications interface 306 also tracks the amount of data received since an acknowledgement packet was last sent by receiver 300. By sending acknowledgement 318, sender 302 receives a signal that data has been received by receiver 300. In this manner, application 310 and sender 302 continue to send data through communications interface 312 to receiver 300.

Figure 4:
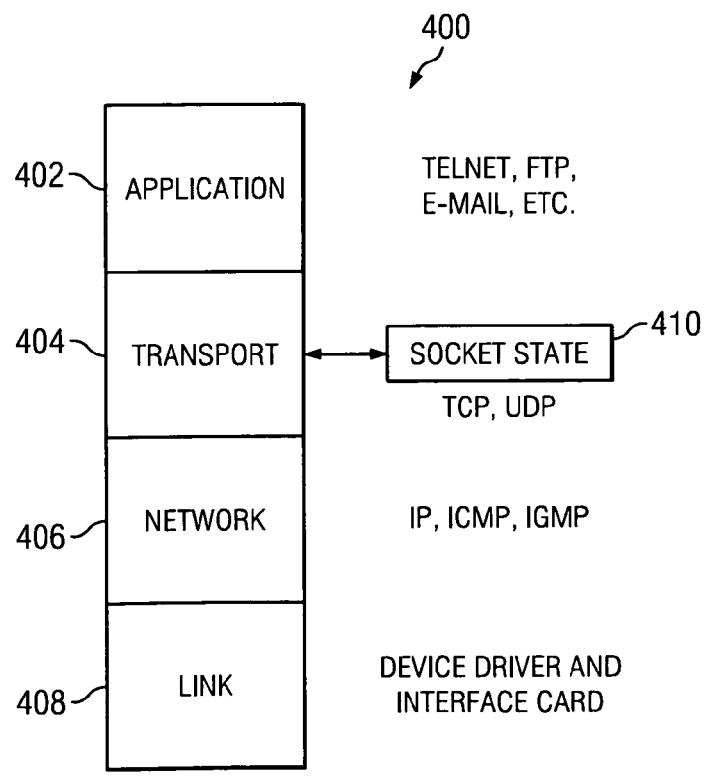
FIG. 4 is a diagram of a transmission control protocol/Internet protocol (TCP/IP) and similar protocols in accordance with a preferred embodiment of the present invention.

FIG. 4 is a diagram of a transmission control protocol/Internet protocol (TCP/IP) and similar protocols in accordance with an illustrative embodiment of the present invention. TCP/IP and similar protocols are utilized by communications architecture 400. In this example, communications architecture 400 is a 4-layer system. This architecture includes application layer 402, transport layer 404, network layer 406, and link layer 408. Each layer is responsible for handling various communications tasks. Link layer 408 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 406 also is referred to as the Internet layer and handles the movement of packets of data around the network. For example, network layer 406 handles the routing of various packets of data that are transferred over the network. Network layer 406 in the TCP/IP suite is comprised of several protocols, including Internet protocol (IP), Internet control message protocol (ICMP), and Internet group management protocol (IGMP).

Next, transport layer 404 provides an interface between network layer 406 and application layer 402 that facilitates the transfer of data between two host computers. Transport layer 404 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and User datagram protocol (UDP). TCP provides reliability services to ensure that data is properly transmitted between two hosts, including dropout detection and retransmission services.

Conversely, UDP provides a much simpler service to the application layer by merely sending packets of data called datagrams from one host to the other, without providing any mechanism for guaranteeing that the data is properly transferred. When using UDP, the application layer must perform the reliability functionality.

Application layer 402 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

In this illustrative example, transport layer 404 is the layer in which aspects of the present invention are implemented in these examples. Transport layer 404 maintains socket state 410. In these examples, socket state 410 is a currently used state in which additional fields have been added to facilitate the different processes of the present invention. In these illustrative examples, a variable xcwin is added to track the current expected congestion window and a variable odata is added to track the amount of data received since acknowledgement packet was last sent. Whenever data is received by transport layer 404, a timer is started.

Additionally, if the data received since the last transmission of an acknowledgement packet is greater than or equal to the current expected congestion window, transport layer 404 initiates the sending of an acknowledgement packet. Whenever an acknowledgement packet is sent, the timer is stopped and the variable for tracking the data received is reset to zero. Additionally, the congestion size window also is reset to a minimum of the expected congestion window plus the maximum segment size or the cap for the congestion window. In these examples, the cap is 32768 bytes.

Figure 5:
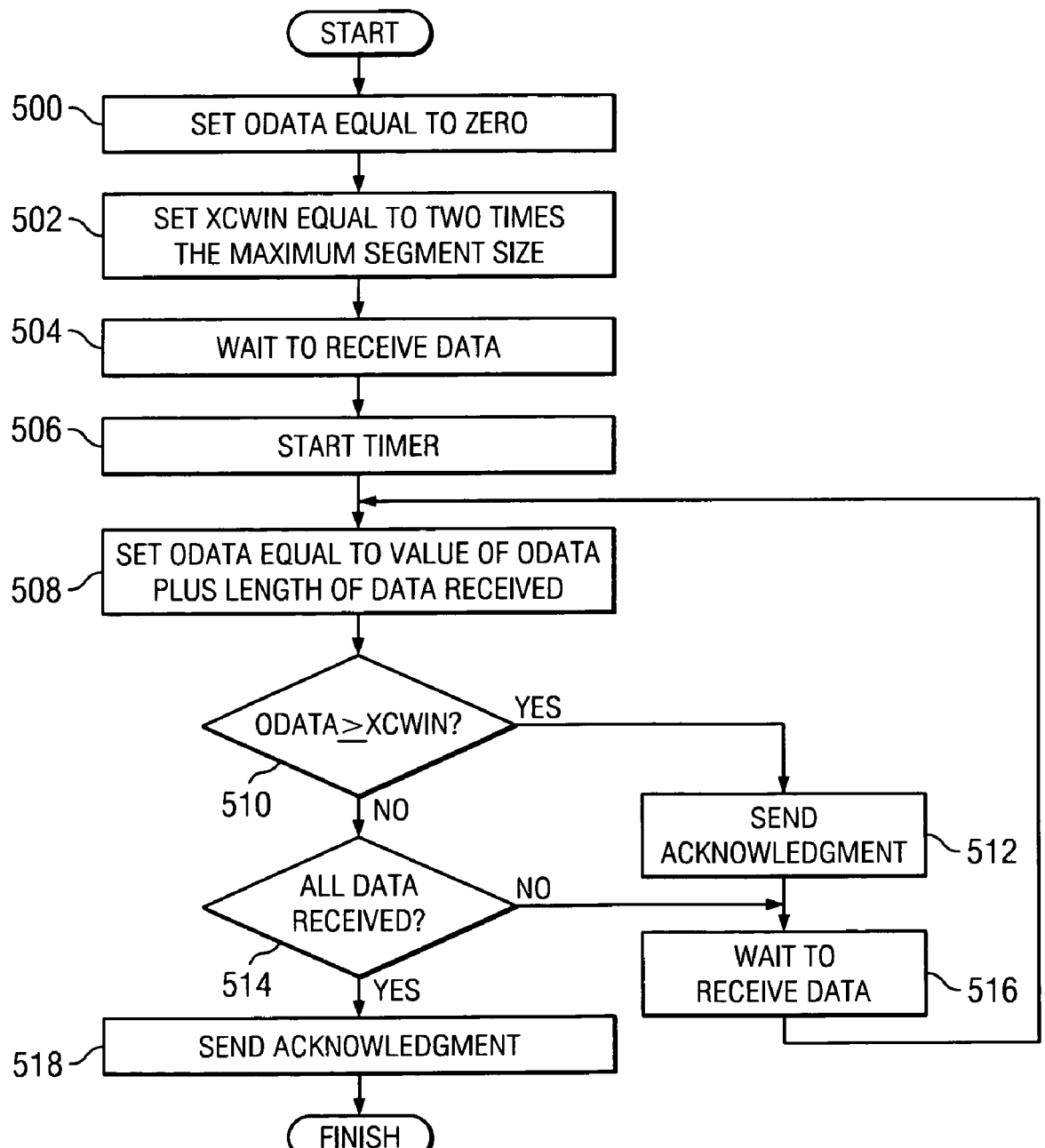
FIG. 5 is a flowchart of a process for sending acknowledgements using a current expected congestion window and an amount of data received since a last acknowledgement packet was sent in accordance with an illustrative embodiment of the present invention.

The different processes are described in more detail with respect to FIGS. 5-7 below. Turning now to FIG. 5, a flowchart of a process for sending acknowledgements using a current expected congestion window and an amount of data received since a last acknowledgement packet was sent is depicted in accordance with an illustrative embodiment of the present invention. The process illustrated in FIG. 5 may be implemented in a transport layer, such as transport layer 404 in FIG. 4.

The process begins by setting a variable of odata equal to zero (step 500). In this example, odata is a variable used to track the amount of data received since an acknowledgement packet was last sent. Next, the variable xcwin is initialized by setting this variable equal to two times the maximum segment size (step 502). Thereafter, the process waits to receive data from the sender (step 504). When data is received, a timer is started (step 506). This timer is used to track a period of time after which an acknowledgement should be sent if not enough data has been received by the receiver.

Thereafter, the variable odata is set equal to the value of odata plus the length of the data received (step 508). Next, a determination is then made as to whether the variable odata is greater than or equal to the variable xcwin (step 510). If odata is greater, an acknowledgement is sent to the sender (step 512) with the process then proceeding to wait to receive additional data from the sender (step 516).

The process then proceeds to step 508 when data is received. In step 510, if the value of odata is not greater than xcwin, the process then proceeds to determine whether all of the data has been received (step 514). If all of the data has not been received, the process waits to receive data (step 516). If all of the data has been received in step 514, an acknowledgement is sent (step 518) with the process terminating thereafter.

Figure 6:
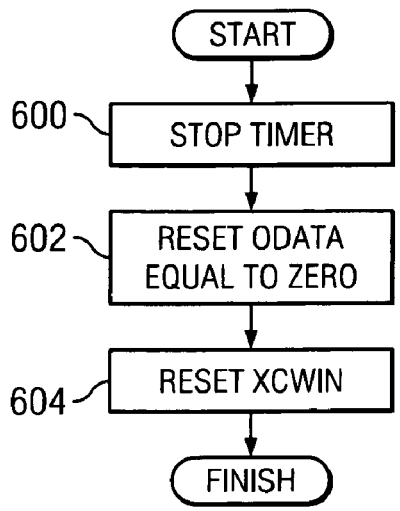
FIG. 6 is a flowchart of a process for resetting variable upon the sending of an acknowledgement in accordance with an illustrative embodiment of the present invention.

Turning now to FIG. 6, a flowchart of a process for resetting variable upon the sending of an acknowledgement is depicted in accordance with an illustrative embodiment of the present invention. The process illustrated in FIG. 6 may be implemented in a transport layer, such as transport layer 404 in FIG. 4. In particular, this process is initiated each time an acknowledgement is sent whether in response to the sending of an acknowledgement in step 512 in FIG. 5 or the sending of an acknowledgement from some other process. This process is not initiated in the instance in which the acknowledgement is sent when a timer fires.

The process begins by stopping the timer (step 600). Thereafter, odata is reset to a value of zero (step 602). Additionally, the variable xcwin also is reset (step 604). In these examples, xcwin is set to a minimum of the value of xcwin plus a maximum segment size or 32768. In this example, the value 32768 is a cap for the variable xcwin and should match the senders cap for the congestion window size. Depending on the particular implementation, this value will vary. The process then terminates.

Figure 7:
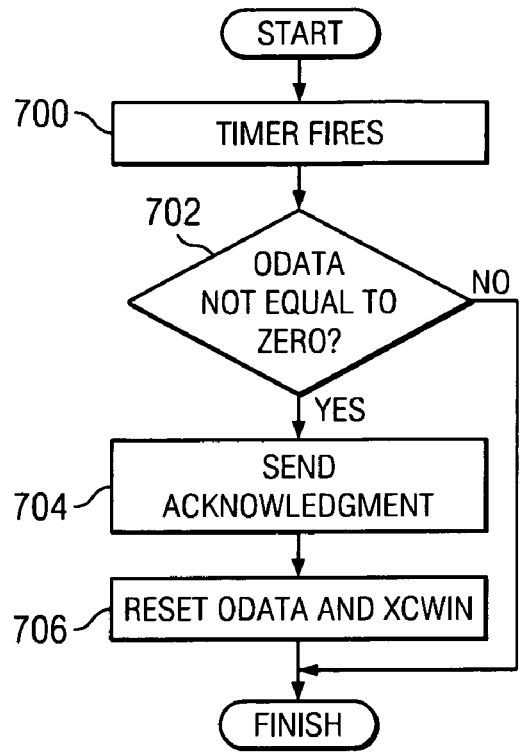
FIG. 7 is a flowchart of a process for managing the firing of a timer in accordance with an illustrative embodiment of the present invention.

Turning next to FIG. 7, a flowchart of a process for managing the firing of a timer is depicted in accordance with an illustrative embodiment of the present invention. The process illustrated in FIG. 7 is implemented in a transport layer, such as transport layer 404 in FIG. 4.

The process begins with a timer firing (step 700). A timer fires when the maximum value has been reached for the timer. The firing of a timer triggers a determination as to whether the value of odata is not equal to zero (step 702). This determination in step 702 is made to see whether enough data has been reached by the receiver. If the value of odata is not equal to zero, an acknowledgement is sent (step 704). Thereafter, the values for odata and xcwin are reset (step 706). In these examples, the value of the variable odata is set equal to zero and variable xcwin is set equal to the maximum segment size. Thereafter, the process terminates.

With reference again to step 702, if odata is not equal to zero, the process terminates. Further, in step 704, the sending of the acknowledgement in response to the firing of a timer does not initiate the process described above with respect to FIG. 6.

Figure 8:
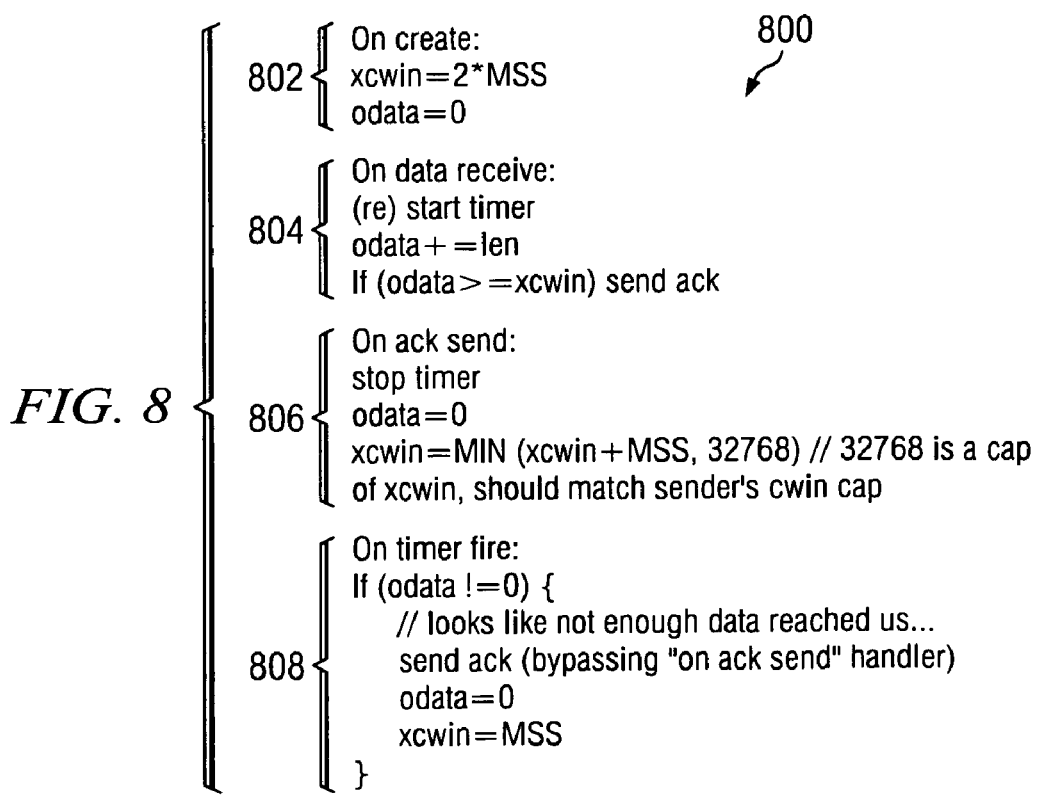
FIG. 8 is a diagram illustrating pseudo code for the different processes used to mange the transfer of data by tracking congestion window sizes in accordance with an illustrative embodiment of the present invention.

With reference now to FIG. 8, a diagram illustrating pseudo code for the different processes used to manage the transfer of data by tracking congestion window sizes is depicted in accordance with an illustrative embodiment of the present invention. In this example, code 800 may be code implemented in a transport layer, such as transport layer 404 in FIG. 4. Section 802 illustrates the initialization of the variables xswin and odata. Section 804 shows the different steps taken when data is received by the receiver. Section 806 illustrates the code executed when an acknowledgement is sent. Section 808 illustrates code executed when a timer fires.

In this manner, the different aspects of the present invention manage to transfer data through network connections. The different aspects of the present invention as described above identifies at what point a sender will stop sending data and then sends an acknowledgement packet to the sender. The different examples employ a process to track the expected size of the sender's congestion window. The acknowledgement is sent once the receiver of data sees that data has been received that is equal to or greater than the size of the sender's congestion window.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a data transfer, the computer implemented method comprising:
   receiving data from a sender across a network connection for the data transfer, wherein the network connection is a transfer control protocol/Internet Protocol connection;
   starting a timer when the data is received from the sender;
   identifying an expected size for a congestion window for the sender;
   setting incrementing an outstanding data variable by an amount of data when the data is received;
   comparing the outstanding data variable to the expected size of the congestion window to determine whether the amount of data received from the sender meets the expected size for the congestion window;
   sending an acknowledgment responsive to the amount of data received from the sender meets the expected size for the congestion window for the sender;
   stopping the timer when the acknowledgment is sent;
   resetting the outstanding data variable to zero when the acknowledgement is sent;
   sending a special acknowledgement if the amount of data received from the sender does not meet the expected size for the congestion window for the sender, wherein the timer is not stopped and the outstanding data variable is not reset when the special acknowledgement is sent; and
   setting the expected size of the congestion window to a value selected from a minimum of the expected size of the congestion window plus a maximum segment size or a cap for the expected size of the congestion window.

\* \* \* \* \*